US012518767B2

(12) United States Patent
Zhang

(10) Patent No.: US 12,518,767 B2
(45) Date of Patent: Jan. 6, 2026

(54) ENCODING METHOD AND APPARATUS, ELECTRONIC DEVICE, AND STORAGE MEDIUM

(71) Applicant: VIVO MOBILE COMMUNICATION CO., LTD., Dongguan (CN)

(72) Inventor: Yong Zhang, Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 294 days.

(21) Appl. No.: 18/333,017

(22) Filed: Jun. 12, 2023

(65) Prior Publication Data

US 2023/0326467 A1 Oct. 12, 2023

Related U.S. Application Data

(63) Continuation of application No. PCT/CN2021/139070, filed on Dec. 17, 2021.

(30) Foreign Application Priority Data

Dec. 24, 2020 (CN) ........................ 202011553903.4

(51) Int. Cl.
*G10L 19/002* (2013.01)
*G10L 25/18* (2013.01)

(52) U.S. Cl.
CPC ............ *G10L 19/002* (2013.01); *G10L 25/18* (2013.01)

(58) Field of Classification Search
CPC ..... G10L 19/002; G10L 25/18; G10L 19/032; G10L 19/0212; G10L 19/24; G10L 19/06
See application file for complete search history.

(56) References Cited

U.S. PATENT DOCUMENTS 8,346,547 B1 * 1/2013 Tang .................... G10L 19/035 704/201
2003/0125932 A1 7/2003 Wang et al.
(Continued)

FOREIGN PATENT DOCUMENTS

CN 1677493 A 10/2005
CN 101101755 A 1/2008
CN 101308659 A * 11/2008
(Continued)

OTHER PUBLICATIONS

International Search Report & Written Opinion related to Application No. PCT/CN2021/139070; reported on Mar. 9. 2022.
(Continued)

*Primary Examiner* — Angelica M McKinney
(74) *Attorney, Agent, or Firm* — von Briesen & Roper, s.c.

(57) ABSTRACT

The present application discloses an encoding method and apparatus, an electronic device, and a storage medium. The method includes: determining an encoding bandwidth of an audio signal of a target frame according to an encoding bit rate of the audio signal of the target frame; determining perceptual entropy of the audio signal of the target frame according to the encoding bandwidth, and determining a bit demand rate of the audio signal of the target frame according to the perceptual entropy; and determining a target number of bits according to the bit demand rate, and encoding the audio signal of the target frame according to the target number of bits.

20 Claims, 6 Drawing Sheets

(56) References Cited

U.S. PATENT DOCUMENTS

| | | | | |
|---|---|---|---|---|
| 2008/0027732 | A1 | 1/2008 | Baumgarte | |
| 2013/0034233 | A1 * | 2/2013 | Fujita | G10L 19/002 381/23 |

FOREIGN PATENT DOCUMENTS

| | | | |
|---|---|---|---|
| CN | 101494054 | A | 7/2009 |
| CN | 101853662 | A | 10/2010 |
| CN | 103366750 | A | 10/2013 |
| CN | 109041024 | A | 12/2018 |
| CN | 112599139 | A | 4/2021 |
| JP | H0629859 | A | 2/1994 |
| KR | 950024441 | A | 8/1995 |

OTHER PUBLICATIONS

First Chinese Office Action for related Application No. 202011553903.4; reported on May 20, 2023.

Extended European Search Report & Written Opinion related to Application No. 21909283.0; reported on Apr. 24, 2024.

3rd Generation Partnership Project; Technical Specification Group Services and System Aspects; General audio codec audio processing functions; Enhanced aacPlus general audio codec; Encoder specification; Advanced Audio Coding (AAC) part (Release 16), 3GPP Draft; 26403-G00, 3rd Generation Partnership Project (3GPP), Mobile Competence Centre ; 650, Route Des Lucioles ; F-06921 Sophia-Antipolis Cedex; France Jul. 21, 2020 (Jul. 21, 2020), XP052298209.

3rd Generation Partnership Project;Technical Specification Group Services and System Aspects; General audio codec audio processing functions; Enhanced aacPlus general audio codec; General description (Release 16), 3GPP Standard; Technical Specification; 3GPP TS 26.401, 3rd Generation Partnership Projec (3GPP), Mobile Competence Centre; 650, Route Des Lucioles; F-06921 Sophia-Antipolis Cedex; France, vol. SA WG4, No. V16.0.0 Jul. 21, 2020 (Jul. 21, 2020), pp. 1-11, XP051925667.

Stefan Meltzer et al: "MPEG-4 He-AAC v2 -audio coding for today's digital media world", Internet Citation, Jan. 31, 2006 (Jul. 21, 2006), pp. 1-12, XP002606212.

* cited by examiner

ENCODING METHOD AND APPARATUS, ELECTRONIC DEVICE, AND STORAGE MEDIUM

CROSS-REFERENCE TO RELATED APPLICATIONS

This application is a continuation application of PCT International Application No. PCT/CN2021/139070 filed on Dec. 17, 2021, which claims priority to Chinese Patent Application No. 202011553903.4 filed in China on Dec. 24, 2020, which are incorporated in their entireties by reference herein.

TECHNICAL FIELD

The present application belongs to the technical field of audio encoding, and specifically relates to an encoding method and apparatus, an electronic device, and a storage medium.

BACKGROUND

Currently, in many audio applications, such as Bluetooth audio, streaming music transmission, and Internet live broadcast, network transmission bandwidth is still a bottleneck. Since content of an audio signal is complex and changeable, if each frame signal is encoded with a same number of encoding bits, it is easy to cause quality fluctuation between frames and reduce the encoding quality of the audio signal.

In order to obtain better encoding quality and meet the limitation of transmission bandwidth, a bit rate control method of an average bit rate (Average Bit Rate, ABR) is usually selected during encoding. The basic principle of ABR bit rate control is to encode, with fewer bits (less than the average encoded bits), a frame that is easy to encode, and store the remaining bits in a bit pool; encode, with more bits (more than the average encoded bits), a frame that is difficult to encode, and extract extra bits required from the bit pool.

Currently, the calculation of perceptual entropy is based on the bandwidth of an input signal, rather than the bandwidth of a signal actually encoded by an encoder, which will cause inaccurate calculation of perceptual entropy, and therefore lead to incorrect allocation of encoded bits.

SUMMARY

The purpose of the embodiments of the present application is to provide an encoding method and apparatus, an electronic device, and a storage medium.

According to a first aspect, an embodiment of the present application provides an encoding method, which includes:

- determining an encoding bandwidth of an audio signal of a target frame according to an encoding bit rate of the audio signal of the target frame;
- determining perceptual entropy of the audio signal of the target frame according to the encoding bandwidth, and determining a bit demand rate of the audio signal of the target frame according to the perceptual entropy; and
- determining a target number of bits according to the bit demand rate, and encoding the audio signal of the target frame according to the target number of bits.

According to a second aspect, an embodiment of the present application provides an encoding apparatus, which includes:

- an encoding bandwidth determination module, configured to determine an encoding bandwidth of an audio signal of a target frame according to an encoding bit rate of the audio signal of the target frame;
- a perceptual entropy determination module, configured to determine perceptual entropy of the audio signal of the target frame according to the encoding bandwidth;
- a bit demand amount determination module, configured to determine a bit demand rate of the audio signal of the target frame according to the perceptual entropy; and
- an encoding module, configured to determine a target number of bits according to the bit demand rate, and encoding the audio signal of the target frame according to the target number of bits.

According to a third aspect, an embodiment of this application provides an electronic device. The electronic device includes a processor, a memory, and a program or an instruction stored in the memory and capable of running on the processor. When the program or the instruction is executed by the processor, the steps of the method according to the first aspect are implemented.

According to a fourth aspect, an embodiment of this application provides a readable storage medium. The readable storage medium stores a program or an instruction, and when the program or the instruction is executed by a processor, the steps of the method in the first aspect are implemented.

According to a fifth aspect, an embodiment of this application provides a chip. The chip includes a processor and a communication interface. The communication interface is coupled to the processor, and the processor is configured to run a program or an instruction to implement the method in the first aspect.

DESCRIPTION OF EMBODIMENTS

The following clearly describes the technical solutions in the embodiments of this application with reference to the accompanying drawings in the embodiments of this application. Apparently, the described embodiments are some rather than all of the embodiments of this application. Based on the embodiments of this application, all other embodiments obtained by a person of ordinary skill in the art without creative efforts fall within the protection scope of this application.

In the specification and claims of this application, the terms "first", "second", and the like are intended to distinguish between similar objects but do not describe a specific order or sequence. It should be understood that the data used in this way is interchangeable in appropriate circumstances so that the embodiments of this application described can be implemented in other orders than the order illustrated or described herein. In addition, in the specification and the claims, "and/or" represents at least one of connected objects, and a character "/" generally represents an "or" relationship between associated objects.

With reference to the accompanying drawings, the following describes in detail the encoding method and apparatus in the embodiments of this application based on specific embodiments and application scenarios.

Figure 1:
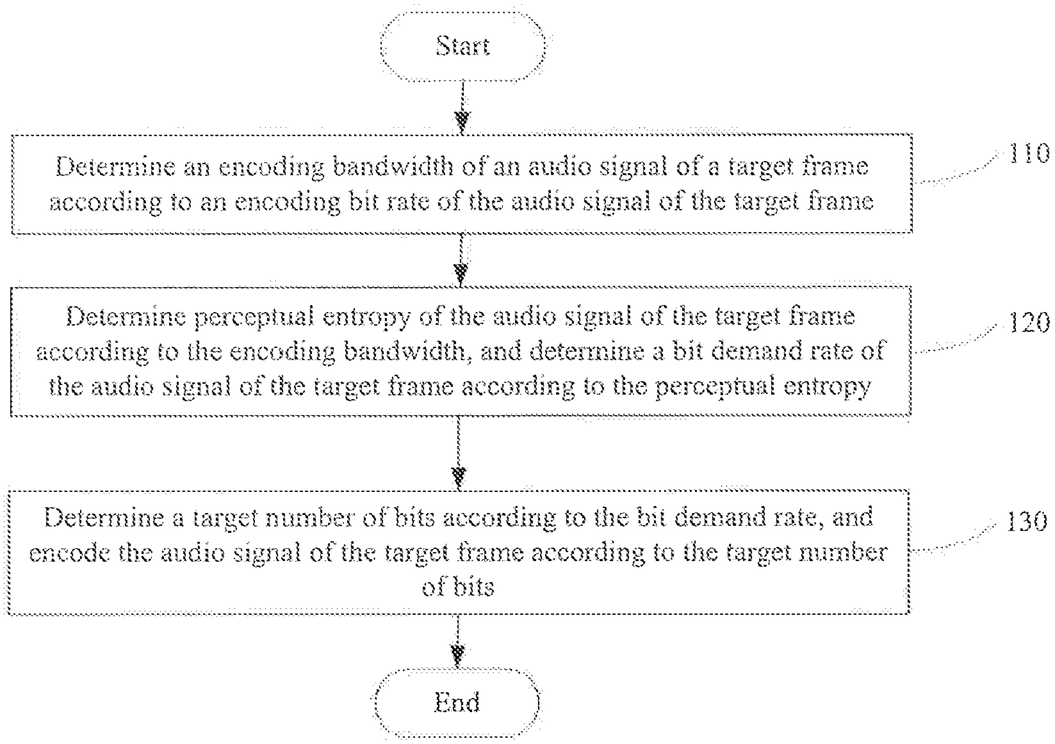
FIG. 1 is a schematic flowchart of an encoding method according to an embodiment of the present application.

FIG. 1 is a schematic flowchart of an encoding method according to an embodiment of the present application. Referring to FIG. 1, the encoding method provided by the embodiment of the present application may include:

Step 110: Determine an encoding bandwidth of an audio signal of a target frame according to an encoding bit rate of the audio signal of the target frame.

Step 120: Determine perceptual entropy of the audio signal of the target frame according to the encoding bandwidth, and determine a bit demand rate of the audio signal of the target frame according to the perceptual entropy.

1Step 130: Determine a target number of bits according to the bit demand rate, and encode the audio signal of the target frame according to the target number of bits.

The execution subject of the encoding method in the embodiment of the present application may be an electronic device, a component in the electronic device, an integrated circuit, or a chip. The electronic device may be a mobile electronic device, or may be a non-mobile electronic device. For example, the mobile electronic device may be a mobile phone, a tablet computer, a laptop computer, a palmtop computer, an in-vehicle electronic device, a wearable device, an ultra-mobile personal computer (UMPC), a netbook, or a personal digital assistant (PDA). The non-mobile electronic device may be a server, a network attached storage (NAS), a personal computer (PC), a television (TV), an automated teller machine or a self-service machine. This is not specifically limited in the embodiments of the present application.

The technical solution of the present application will be described in detail below by taking an example in which a personal computer executes the encoding method provided in the embodiment of the present application.

Specifically, in step 110, after determining the encoding bit rate of the audio signal of the target frame, a computer can determine the encoding bandwidth of the audio signal of the target frame according to a correspondence between the encoding bit rate and the encoding bandwidth. The correspondence between the coding bit rate and the coding bandwidth may be determined by relevant protocols or standards, or may be preset.

In step 120, the perceptual entropy of each of the scale factor bands of the audio signal of the target frame can be obtained according to the encoding bandwidth of the audio signal of the target frame based on related parameters of modified discrete cosine transform MDCT, thereby determining perceptual entropy of the audio signal of the target frame.

Then, the bit demand rate of the audio signal of the target frame can be determined according to the perceptual entropy, so that in step 130, the target number of bits is determined according to the bit demand rate, and the audio signal of the target frame is encoded according to the target number of bits.

The target frame may be a current inputted frame, or other frames to be encoded, for example, other frames that are to be encoded and that are inputted into a cache in advance. The target number of bits is a number of bits used to encode the audio signal of the target frame.

In the encoding method provided by the embodiments of the present application, since the actual encoding bandwidth of the audio signal of the target frame is determined according to the encoding bit rate of the audio signal of the target frame, to calculate the perceptual entropy, the calculation result of the perceptual entropy is accurate. Moreover, in the encoding method provided by the embodiments of the present application, the number of bits is determined according to the accurate perceptual entropy, to encode the audio signal of the target frame, so that the unreasonable allocation of encoding bits can be avoided, and encoding resources can be saved and encoding efficiency can be improved.

Specifically, in an embodiment, the determining perceptual entropy of the audio signal of the target frame according to the encoding bandwidth includes:

S1211: Determine a number of scale factor bands of the audio signal of the target frame according to the encoding bandwidth.

S1212: Obtain perceptual entropy of each of the scale factor bands.

S1213: Determine the perceptual entropy of the audio signal of the target frame according to the number of scale factor bands and the perceptual entropy of each of the scale factor bands.

Specifically, the number of scale factor bands of the audio signal of the target frame can be determined first according to, for example, a scale factor band offset table (Table 3.4) of the ISO/IEC 13818-7 standard document, and then the perceptual entropy of each of the scale factor bands can be obtained.

In the embodiment of this application, step S1212 may include:

S1212*a*: Determine a MDCT spectral coefficient of the audio signal of the target frame after modified discrete cosine transform (MDCT).

S1212*b*: Determine MDCT spectral coefficient energy of each of the scale factor bands according to the MDCT spectral coefficient and a scale factor band offset table.

S1212*c*: Determine perceptual entropy of each of the scale factor bands according to the MDCT spectral coefficient energy and a masking threshold of each of the scale factor bands.

It should be noted that MDCT is a linear orthogonal lapped transform. It can effectively overcome the edge effect in the windowed discrete cosine transform (DCT) block processing operation without reducing the encoding performance, thereby effectively removing the periodic noise generated by the edge effect. In the case of the same encoding rate, compared with the related technology using DCT, the performance of MDCT is better.

Further, based on the scale factor band offset table, the MDCT spectral coefficient energy of each of the scale factor bands can be determined by performing cumulative calculation on the MDCT spectral coefficients or the like.

In the encoding method provided by the embodiment of the present application, the MDCT spectral coefficient, the MDCT spectral coefficient energy, and the masking threshold of each scale factor band are fully considered when obtaining the perceptual entropy of each of the scale factor bands. Therefore, the obtained perceptual entropy of each of the scale factor bands can accurately reflect the energy fluctuation of each of the scale factor bands.

After the perceptual entropy of each of the scale factor bands is obtained, the perceptual entropy of the audio signal of the target frame can be determined according to the number of scale factor bands and the perceptual entropy of each of the scale factor bands.

It can be understood that in the encoding method provided by the embodiment of the present application, the perceptual entropy of each of the scale factor bands of the audio signal of the target frame is first obtained, and then perceptual entropy of the audio signal of the target frame is determined according to the perceptual entropy of each of the scale factor bands. Therefore, the accuracy of the obtained perceptual entropy of the audio signal of the target frame can be guaranteed.

Further, in an embodiment, the determining a bit demand rate of the audio signal of the target frame according to the perceptual entropy may include:

S1221: Obtain average perceptual entropy of audio signals of a preset number of frames before the audio signal of the target frame.

S1222: Determine a difficulty coefficient of the audio signal of the target frame according to the perceptual entropy and the average perceptual entropy.

S1223: Determine the bit demand rate of the audio signal of the target frame according to the difficulty coefficient.

In the embodiment of the present application, the size of the preset number may be, for example, 8, 9, 10 and so on. Its specific size can be adjusted according to the actual situation, and is not specifically limited in this embodiment of the present application.

After the average perceptual entropy is obtained, the difficulty coefficient of the audio signal of the target frame may be determined according to the perceptual entropy and the average perceptual entropy based on a preset calculation method of the difficulty coefficient. The preset calculation method of the difficulty coefficient may be: difficulty coefficient=(perceptual entropy−average perceptual entropy)/average perceptual entropy.

In the embodiment of the present application, the bit demand rate of the audio signal of the target frame may be determined through a preset mapping function of the difficulty coefficient and the bit demand rate.

In the encoding method provided by the embodiment of the present application, since the average perceptual entropy of the audio signals of the preset number of frames before the audio signal of the target frame is used to determine the bit demand rate, it avoids that the perceptual entropy of the audio signal of the target frame is directly used to determine the bit demand rate in the related art, and consequently the final estimated number of bits is inaccurate.

Further, in an embodiment, the determining the target number of bits according to the bit demand rate may include:

- S1311: Determine a fullness degree of a current bit pool according to a number of available bits in the current bit pool and a size of the bit pool.
- S1312: Determine, according to the fullness degree, a bit pool adjustment rate in encoding the audio signal of the target frame, and determine an encoding bit factor according to the bit demand rate and the bit pool adjustment rate.
- S1313: Determine the target number of bits according to the encoding bit factor.

It should be noted that the fullness degree of the bit pool may be a ratio of the number of available bits in the bit pool to the size of the bit pool.

In the embodiment of the present application, the bit pool adjustment rate in encoding the audio signal of the target frame can be determined through a preset mapping function of the fullness degree and the bit pool adjustment rate.

After the bit demand rate and the bit pool adjustment rate are determined, the encoding bit factor can be obtained through the bit demand rate and the bit pool adjustment rate according to a preset calculation method of the encoding bit factor.

In the embodiment of the present application, the target number of bits can be a product of the encoding bit factor and an average number of encoding bits of each frame of signal. The average number of encoding bits of each frame of signal is determined based on the frame length of a frame of audio signal and a sampling frequency and an encoding bit rate of the audio signal.

In the encoding method provided by the embodiment of the present application, the fullness degree of the current bit pool is analyzed, to determine the bit pool adjustment rate and the encoding bit factor; and factors such as the status of the bit pool, the degree of difficulty in encoding audio signals, and the allowable range of bit rate changes are comprehensively considered, which can effectively prevent bit pool overflow or underflow.

The encoding method provided by the embodiment of the present application will be described below by taking the encoding of the stereo audio signal sc03.wav as an example.

An encoding bit rate bitRate of the stereo audio signal sc03.wav is 128 kbps.

The bit pool size maxbitRes is 12288 bits (6144 bit/channel).

A sampling frequency Fs is 48 kHz.

A frame length of a frame of audio signal is N=1024.

An average number of encoded bits of each frame of signal meanBits is 1024×128×1000/48000=2731 bits.

Table 1 shows a correspondence between a stereo encoding rate and an encoding bandwidth.

TABLE 1

Correspondence between stereo encoding bit rate and encoding bandwidth

| Encoding bit rate | Encoding bandwidth |
|---|---|
| 64 kbps-80 kbps | 13.05 kHz |
| 80 kbps-112 kbps | 14.26 kHz |
| 112 kbps-144 kbps | 15.50 kHz |
| 144 kbps-192 kbps | 16.12 kHz |
| 192 kbps-256 kbps | 17.0 kHz |

It can be seen from Table 1 that the actual encoding bandwidth corresponding to the encoding bit rate bitRate=128 kbps of the stereo audio signal sc03.wav is Bw=15.50 kHz.

After the encoding bandwidth is determined, the perceptual entropy of the audio signal of the target frame can be determined according to the encoding bandwidth.

Specifically, according to the scale factor band offset table (Table 3.4) of the ISO/IEC 13818-7 standard document, as can be seen, when an input signal sampling rate Fs=48 kHz, a scale factor band value corresponding to Bw=15.50 kHz is M=41, that is, the scale factor band number of the audio signal of the target frame is 41.

The steps of obtaining the perceptual entropy of each of the scale factor bands can be specifically implemented as follows:

It is assumed that the MDCT spectral coefficient obtained after the audio signal of the target frame is transformed by MDCT is X[k], k=0, 1, 2, . . . , M−1; the MDCT spectral coefficient energy of each of the scale factor bands is en[n], where n=0, 1, 2, . . . , M−1.

Then, en[n] is calculated as follows:

$$en[n] = \sum_{k=kOffset[n]}^{kOffset[n+1]-1} (X[k] \cdot X[k]) \tag{1}$$

where kOffset[n] represents the scale factor band offset table.

The perceptual entropy of each scale factor band is sfbPe[n], where n=0, 1, 2, . . . , M−1, and is calculated as follows:

$$sfbPe[n] = nl \cdot \begin{cases} \log_2\left(\frac{en(n)}{thr(n)}\right) & \log_2\left(\frac{en(n)}{thr(n)}\right) \ge c1 \\ c2 + c3 \cdot \log_2\left(\frac{en(n)}{thr(n)}\right) & \log_2\left(\frac{en(n)}{thr(n)}\right) < c1 \end{cases} \tag{2}$$

In formula (2), c1, c2, and c3 are all constants, and c1=3, c2=$\log_2$ (2.5) and c3=1−c2/c1.thr[n] is a masking threshold of each of the scale factor bands outputted by a psychoacoustic model, where n=0, 1, 2, . . . , M−1.

nl is a number of MDCT spectral coefficients that are not 0 after quantization of each scale factor band, and is calculated as follows:

$$nl = \frac{\sum_{k=kOffset[n]}^{kOffset[n+1]-1} \sqrt{|X[k]|}}{\left(\frac{en[n]}{kOffset[n+1] - kOffset[n]}\right)^{0.25}} \tag{3}$$

After the perceptual entropy of each of the scale factor bands is obtained, the perceptual entropy of the audio signal of the target frame can be determined according to the number of scale factor bands and the perceptual entropy of each of the scale factor bands.

It is assumed that the target frame is an $l^{th}$ frame. Then, the perceptual entropy Pe[l] of the audio signal of the target frame is calculated as follows:

$$Pe[l] = \sum_{n=0}^{M-1} sfbPe[n] + \text{offset} \tag{4}$$

In formula (4), offset is an offset constant, which is defined as:

$$\text{offset} = \begin{cases} 0 & bitRate > 64\ kbps \\ \max\left(50, 100 - \frac{bitrate}{64}\right) & bitRate \le 64\ kbps \end{cases} \tag{13}$$

The step of determining the bit demand rate of the audio signal of the encoding target frame according to the perceptual entropy can be specifically implemented as follows:

It is assumed that the average perceptual entropy is $PE_{average}$, which is the average perceptual entropy of previous N1 frames of audio signals. Then, $PE_{average}$ is calculated as follows:

$$PE_{average} = \frac{\sum_{m=1-N1}^{l-1} Pe[m]}{N1} \tag{5}$$

In this example, N1 has a value of 8. That is, the average perceptual entropy is the average value of the perceptual entropy of previous 8 frames of audio signals. For example, the current frame is the 10th frame, that is, l=10, and then $PE_{average}$ is the average of Pe[9], Pe[8], Pe[7], Pe[6], Pe[5], Pe[4], Pe[3], and Pe[2].

Of course, the specific value of N1 can also be adjusted according to actual needs, for example, N1 can also be 7, 10, 15, etc., and this is not limited in the embodiment of the present application.

After obtaining the average perceptual entropy of the audio signal of the preset number of frames, the difficulty coefficient of the audio signal of the target frame can be determined according to the average perceptual entropy and the perceptual entropy of the audio signal of the target frame.

For an $l^{th}$ frame, the difficulty factor D[l] is calculated as follows:

$$D[l] = \frac{Pe[l] - PE_{average}}{PE_{average}} \tag{6}$$

After the difficulty coefficient of the audio signal of the target frame is determined, the bit demand rate of the audio signal of the target frame can be determined.

It is assumed that the bit demand rate of the audio signal of the target frame is $R_{demand}$[l], which is calculated as follows:

$$R_{demand}[l] \times \eta(D[l]) \tag{7}$$

η( ) is a mapping function of the difficulty coefficient and the bit demand rate. In the mapping function, the relative difficulty coefficient D[l] is the independent variable, and the bit demand rate $R_{demand}$[l] is a linear piecewise function of a function value.

In this embodiment, the mapping function η( ) is defined as follows:

$$R_{demand} = \begin{cases} 1 & D[l] \in (1.3, +\infty] \\ D[l]/1.3 & D[l] \in (0, 1.3] \\ -25D[l]/8 & D[l] \in (-0.25, 0] \\ -3D[l]/5 - 0.77 & D[l] \in (-0.7, -0.25] \\ -0.35 & D[l] \in (-\infty, -0.7] \end{cases} \tag{14}$$

Figure 2:
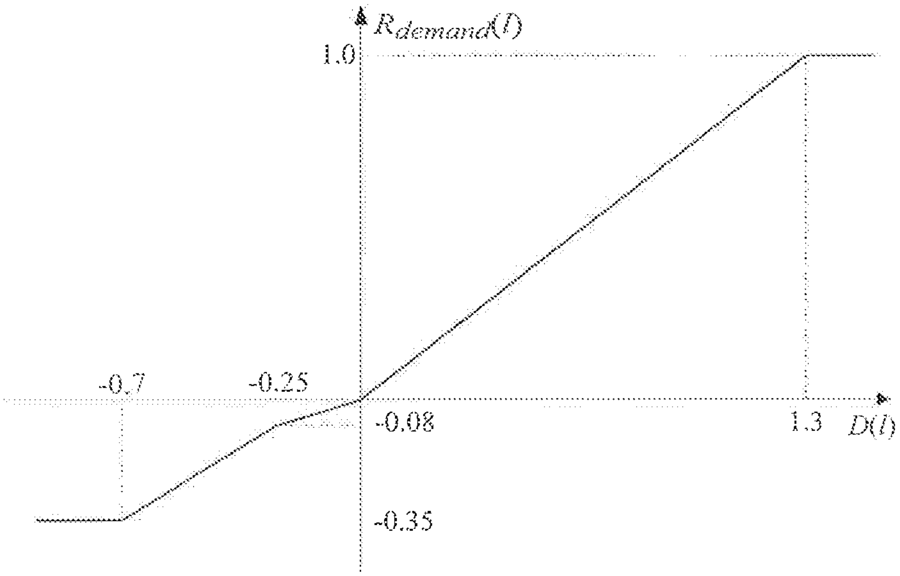
FIG. 2 is a function image of a mapping function η( ) according to an embodiment of the application.

The function image of the mapping function η( ) is shown in FIG. 2.

Further, the step of determining the target number of bits according to the bit demand rate can be specifically implemented as follows:

assuming that bitRes is the number of available bits in the current bit pool, and F is the fullness degree of the current bit pool, $$F = \text{bitRes}/\text{maxbitRes} \tag{8}$$

After obtaining the bit pool fullness degree F., the bit pool adjustment rate in encoding the audio signal of the target frame can be determined according to the bit pool fullness degree F.

It is assumed that the bit pool adjustment rate in encoding the audio signal of the target frame is $R_{adjust}[l]$ a which is calculated as follows:

$$R_{adjust}[l] = \varphi(F) \tag{9}$$

φ( ) is a mapping function of the bit pool fullness degree and the bit pool adjustment rate. The mapping function is a linear piecewise function with the bit pool fullness degree F. as the independent variable and the bit pool adjustment rate $R_{adjust}$ [l] as the function value.

In this example, φ( ) is defined as follows:

$$R_{adjust} = \begin{cases} 0 & F \in [0, 0.25) \\ F + 0.8 & F \in [0.25, 0.35) \\ 9F/14 + 0.925 & F \in [0.35, 0.7) \\ 5F/12 - 7/24 + 1.375 & F \in [0.7, 1.0] \end{cases} \tag{15}$$

Figure 3:
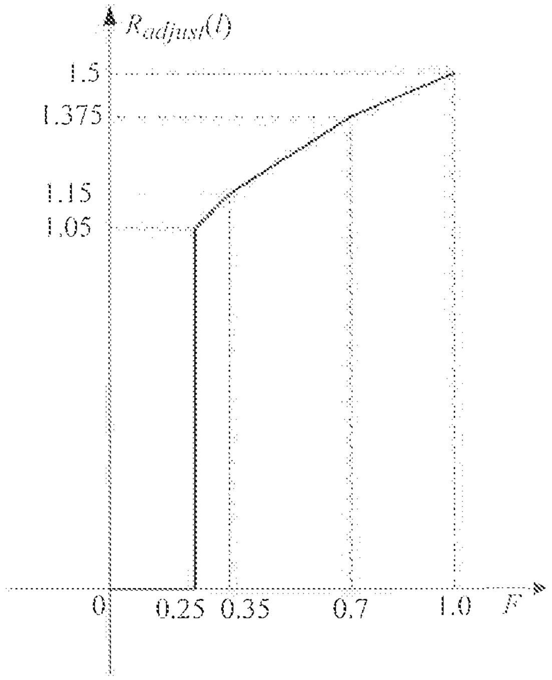
FIG. 3 is a function image of a mapping function φ( ) according to an embodiment of the application.

The function image of the mapping function φ( ) is shown in FIG. 3.

Further, assuming that the encoding bit factor is bitFac[l] its calculation is as follows:

$$bitFac[l] = \begin{cases} 1 + R_{demand}[l] & R_{demand}[l] < 0 \\ 1 + R_{demand}[l] \cdot R_{adjust}[l] & R_{demand}[l] \geq 0 \end{cases} \tag{10}$$

When bitFac[l]>1, it means that the current $l^{th}$ frame is a frame that is more difficult to encode, the number of bits for encoding the current frame is more than the average encoding bits, and the extra bits required for encoding (the number of bits for encoding the current frame–the average number of encoded bits) are extracted from the bit pool.

When bitFac[l]<1, it means that the current $l^{th}$ frame is a frame that is easier to encode, the number of bits for encoding the current frame is less than the average encoding bits, and the remaining bits after encoding (the average number of encoded bits–the number of bits for encoding the current frame) are stored in the bit pool.

After obtaining the encoding bit factor bitFac[l], the target number of bits can be determined according to the encoding bit factor bitFac[l].

Assuming that the number of target bits is availableBits, $$\text{availableBits} = \text{bitFac}[l] \times \text{meanBits} \tag{11}$$

In formula (11), when encoding is performed according to a specified bit rate, the average number of encoded bits meanBits of each frame of signal is calculated as follows:

$$\text{meanBits} = N * \text{bitRate} * 1{,}000/Fs \tag{12}$$

When a frame length of a frame of audio signal is N=1024 and the sampling frequency Fs=48 kHz, the target number of bits availableBits is:

$$\text{availableBits} = \text{bitFac}[l] * 2{,}731 \tag{16}$$

Figure 4:
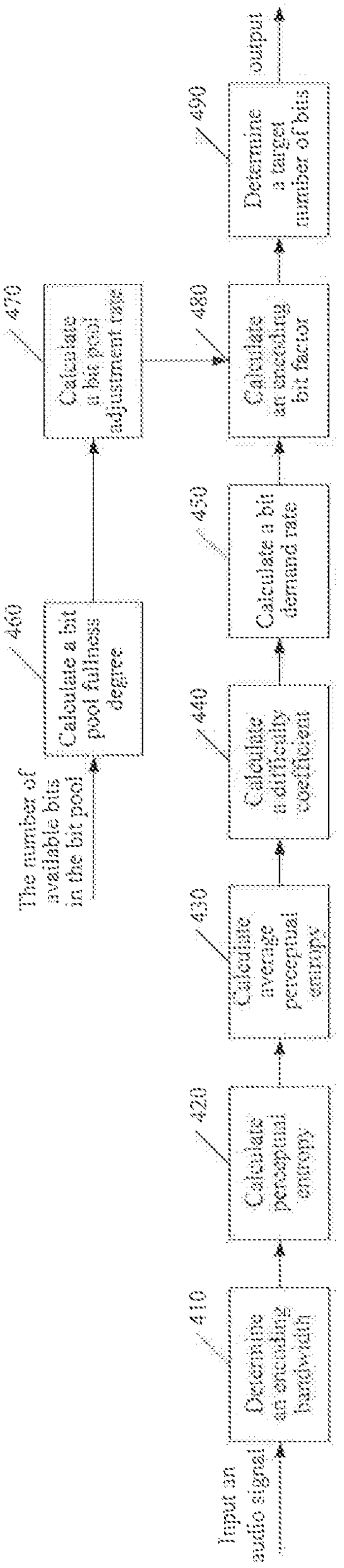
FIG. 4 is an overall block flowchart of an encoding method according to an embodiment of the present application.

FIG. 4 is an overall flowchart of the encoding method according to the embodiment of the present application. In order to facilitate the understanding and implementation of the encoding method provided in the embodiment of the present application, as shown in FIG. 4, the encoding method provided in the embodiment of the present application can be further divided into step 410 to step 490:

Step 410: Determine the encoding bandwidth of the audio signal of the target frame.

Step 420: Calculate the perceptual entropy of the audio signal of the target frame.

Step 430: Calculate the average perceptual entropy of the audio signals of a preset number of frames.

Step 440: Calculate the difficulty coefficient of the audio signal of the target frame.

Step 450: Calculate the bit demand rate of the audio signal of the target frame.

Step 460: Calculate the current bit pool fullness degree.

Step 470: Calculate the bit pool adjustment rate in encoding the audio signal of the target frame.

Step 480: Calculate the encoding bit factor.

Step 490: Determine the target number of bits.

For specific implementation manners of steps 410 to 490, reference may be made to relevant records of the foregoing embodiments, and details are not repeated here.

Figure 5:
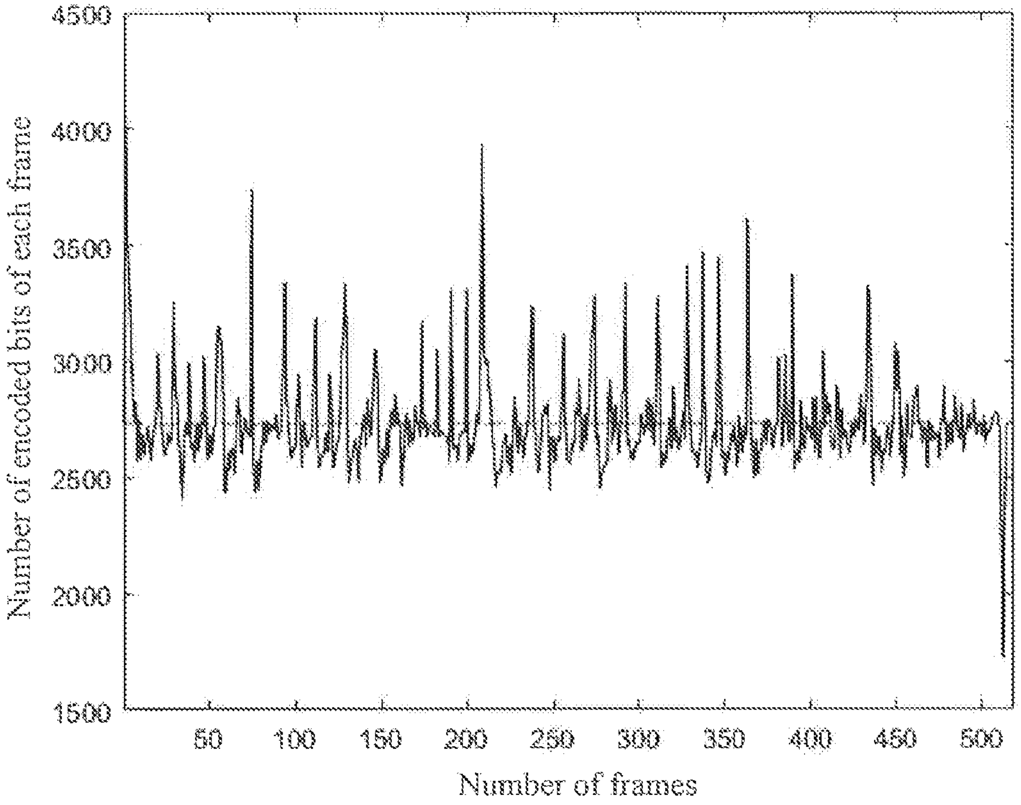
FIG. 5 is a waveform diagram of a number of encoded bits when encoding is performed using the encoding method provided by the embodiment of the present application.
Figure 6:
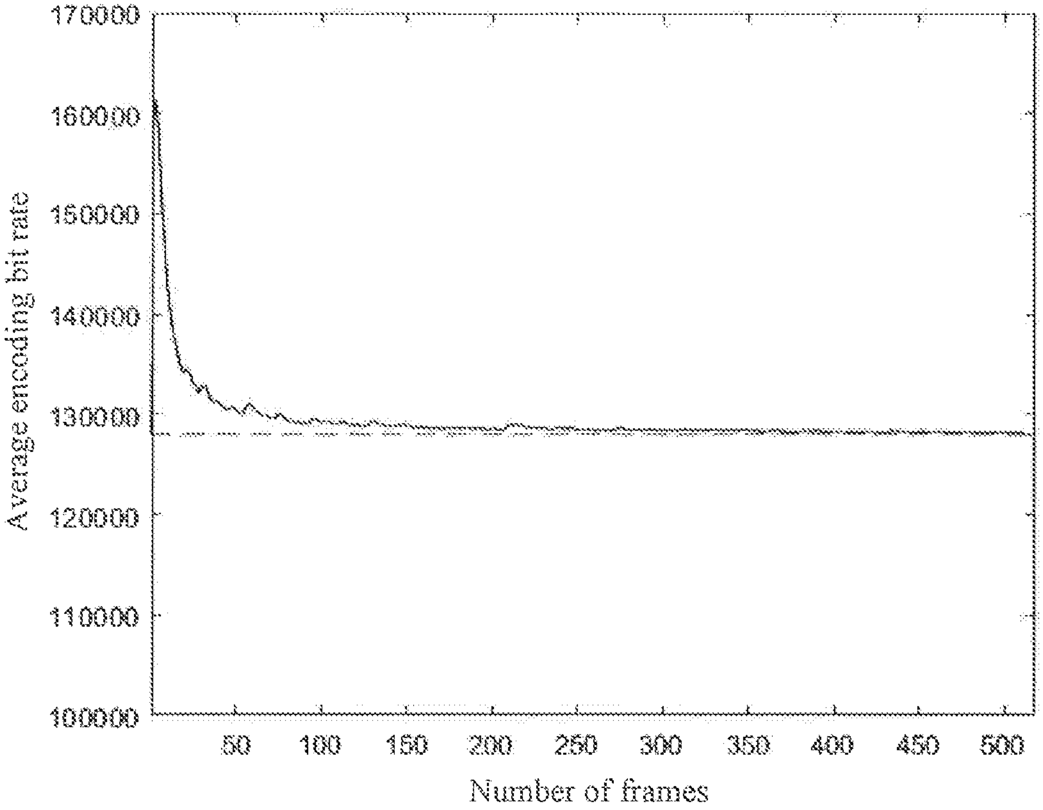
FIG. 6 is a waveform diagram of an average encoding bit rate when encoding is performed using the encoding method provided by the embodiment of the present application.

FIG. 5 and FIG. 6 show waveform diagrams of the number of encoded bits and the average encoding bit rate of each frame of signal when the audio signal sc03.wav is encoded using the encoding method provided by the embodiment of the present application.

In FIG. 5, a solid line represents an actual number of encoded bits of each frame of signal, and a dotted line represents an average number of encoded bits (2731) of every frame of signal when encoding by using the specified bit rate 128 kbps. As can be seen from FIG. 5, in the encoding process, the actual number of encoded bits fluctuates around the average number of encoded bits, which shows that the encoding method provided by the embodiment of the present application can reasonably determine the number of bits for encoding each frame of signal.

In FIG. 6, a solid line represents an average encoding bit rate in the encoding process, and a dotted line represents a specified target encoding bit rate (128000). As can be seen from FIG. 6, as time increases, the overall average encoding bit rate in the encoding method provided by the embodiment of the present application tends to be consistent with the specified target encoding bit rate.

To sum up, the encoding method provided by the embodiment of the present application can obtain as stable encoding quality as possible under the premise that the average encode rate is close to the target encode rate. At the same time, the encoding method provided by the embodiment of the present application solves the problem of bit pool overflow and underflow in the existing ABR bit rate control technology, and can reasonably determine the number of bits for encoding each frame of signal, and has better performance in suppressing quality fluctuation between frames.

It should be noted that the execution subject of the encoding method provided in the embodiment of the present application may also be an encoding apparatus, or a control module in the encoding apparatus for executing the encoding method.

Figure 7:
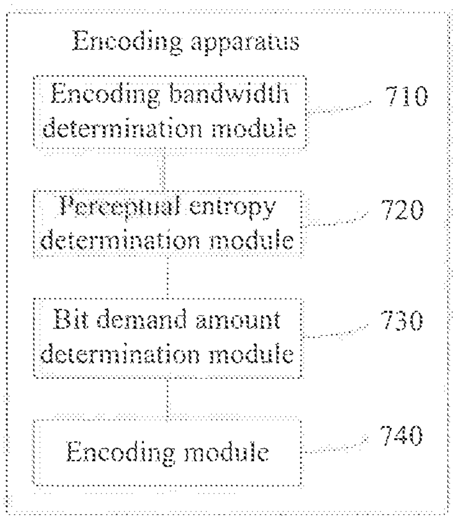
FIG. 7 is a schematic structural diagram of an encoding apparatus according to an embodiment of the present application.

FIG. 7 is a schematic structural diagram of an encoding apparatus according to an embodiment of the present application. Referring to FIG. 7, the encoding apparatus provided by the embodiment of the present application may include:

an encoding bandwidth determination module 710, configured to determine an encoding bandwidth of an audio signal of a target frame according to an encoding bit rate of the audio signal of the target frame;

a perceptual entropy determination module 720, configured to determine perceptual entropy of the audio signal of the target frame according to the encoding bandwidth;

a bit demand amount determination module 730, configured to determine a bit demand rate of the audio signal of the target frame according to the perceptual entropy; and an encoding module 740, configured to determine a target number of bits according to the bit demand rate, and encoding the audio signal of the target frame according to the target number of bits.

In the encoding apparatus provided by the embodiments of the present application, since the actual encoding bandwidth of the audio signal of the target frame is determined according to the encoding bit rate of the audio signal of the target frame, to calculate the perceptual entropy, the calculation result of the perceptual entropy is accurate. Moreover, in the encoding apparatus provided by the embodiments of the present application, the number of bits is determined according to the accurate perceptual entropy, to encode the audio signal of the target frame, so that the unreasonable allocation of encoding bits can be avoided, and encoding resources can be saved and encoding efficiency can be improved.

In an embodiment, the encoding module 730 is specifically configured to: determine a fullness degree of a current bit pool according to a number of available bits in the current bit pool and a size of the bit pool; determine, according to the fullness degree, a bit pool adjustment rate in encoding the audio signal of the target frame, and determine a encoding bit factor according to the bit demand rate and the bit pool adjustment rate; and determine the target number of bits according to the encoding bit factor.

In an embodiment, the perceptual entropy determination module 720 includes: a first determination submodule, configured to determine a number of scale factor bands of the audio signal of the target frame according to the encoding bandwidth; an obtaining submodule, configured to obtain perceptual entropy of each of the scale factor bands; and a second determination submodule, configured to determine the perceptual entropy of the audio signal of the target frame according to the number of scale factor bands and the perceptual entropy of each of the scale factor bands.

In an embodiment, the bit demand determination module 730 is specifically configured to: obtain average perceptual entropy of audio signals of a preset number of frames before the audio signal of the target frame; determine a difficulty coefficient of the audio signal of the target frame according to the perceptual entropy and the average perceptual entropy; and determine the bit demand rate of the audio signal of the target frame according to the difficulty coefficient.

In an embodiment, the obtaining submodule is specifically configured to: determine a MDCT spectral coefficient of the audio signal of the target frame after modified discrete cosine transform MDCT; determine MDCT spectral coefficient energy of each of the scale factor bands according to the MDCT spectral coefficient and a scale factor band offset table; and determine perceptual entropy of each of the scale factor bands according to the MDCT spectral coefficient energy and a masking threshold of each of the scale factor bands.

To sum up, the encoding apparatus provided by the embodiment of the present application can obtain as stable encoding quality as possible under the premise that the average encode rate is close to the target encode rate. At the same time, the encoding apparatus provided by the embodiment of the present application solves the problem of bit pool overflow and underflow in the existing ABR bit rate control technology, and can reasonably determine the number of bits for encoding each frame of signal, and has better performance in suppressing quality fluctuation between frames.

The encoding apparatus in the embodiments of the present application may be an apparatus, or may be a component, an integrated circuit, or a chip in a terminal. The apparatus may be a mobile electronic device, or may be a non-mobile electronic device. For example, the mobile electronic device may be a mobile phone, a tablet computer, a laptop computer, a palmtop computer, an in-vehicle electronic device, a wearable device, an ultra-mobile personal computer (UMPC), a netbook, or a personal digital assistant (PDA). The non-mobile electronic device may be a server, a network attached storage (NAS), a personal computer (PC), a television (TV), an automated teller machine or a self-service machine. This is not specifically limited in the embodiments of the present application.

The encoding apparatus in the embodiments of the present application may be an apparatus with an operating system. The operating system may be an Android (Android) operating system, may be an iOS operating system, or may be another possible operating system, which is not specifically limited in the embodiments of this application.

The apparatus provided in this embodiment of the present application can implement all steps of the methods in the method embodiments, and the same technical effects can be achieved. To avoid repetition, details are not described herein again.

Figure 8:
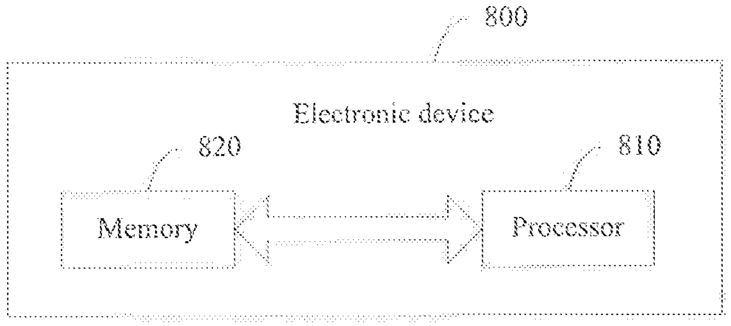
FIG. 8 is a schematic structural diagram of an electronic device according to an embodiment of this application.

Optionally, the embodiment of the present application further provides an electronic device. As shown in FIG. 8, the electronic device 800 includes a processor 810, a memory 820, and programs or instructions stored in the memory 820 and executable on the processor 810. When the program or instruction is executed by the processor 810, the various processes of the foregoing encoding method embodiments can be achieved, and the same technical effect can be achieved. To avoid repetition, details are not repeated here.

It should be noted that the electronic device in this embodiment of this application includes the foregoing mobile electronic device and the foregoing non-mobile electronic device.

Figure 9:
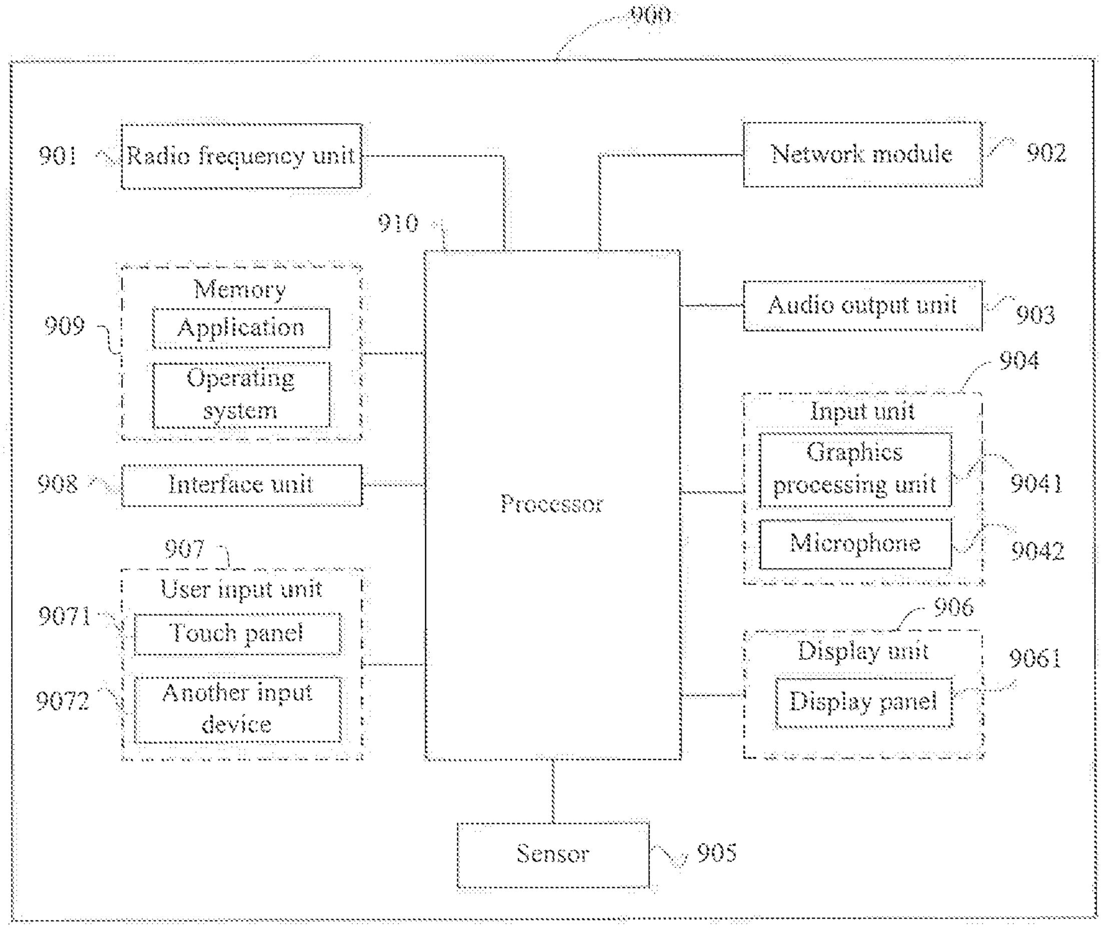
FIG. 9 is a schematic diagram of a hardware structure of an electronic device according to an embodiment of the present application.

FIG. 9 is a schematic structural diagram of hardware of an electronic device according to an embodiment of this application. As shown in FIG. 9, the electronic device 900 includes but is not limited to: a radio frequency unit 901, a network module 902, an audio output unit 903, an input unit 904, a sensor 905, a display unit 906, a user input unit 907, an interface unit 908, a memory 909, a processor 910, a power supply 911 and the like.

A person skilled in the art can understand that the electronic device 900 may further include a power supply (such as a battery) that supplies power to each component. The power supply may be logically connected to the processor 910 by using a power supply management system, to implement functions such as charging and discharging management, and power consumption management by using the power supply management system. The structure of the electronic device shown in FIG. 9 does not constitute a limitation on the electronic device. The electronic device may include components more or fewer components than those shown in the diagram, a combination of some components, or different component arrangements. Details are not described herein.

In this embodiment of this application, the electronic device includes but is not limited to a mobile phone, a tablet computer, a notebook computer, a palmtop computer, an in-vehicle terminal, a wearable device, a pedometer, and the like.

The user input unit 907 is configured to receive a control instruction input by a user to determine whether to perform the encoding method provided by the embodiment of the present application.

The processor 910 is configured to: determine an encoding bandwidth of an audio signal of a target frame according to an encoding bit rate of the audio signal of the target frame; determine perceptual entropy of the audio signal of the target frame according to the encoding bandwidth, and determine a bit demand rate of the audio signal of the target frame according to the perceptual entropy; and determine a target number of bits according to the bit demand rate, and encode the audio signal of the target frame according to the target number of bits.

It should be noted that the electronic device 900 in this embodiment can implement each process in the foregoing method embodiments in the embodiments of this application, and achieve a same beneficial effect. To avoid repetition, details are not described herein again.

It should be understood that, in this embodiment of this application, the radio frequency unit 901 may be configured to receive and send information or a signal in a call process. Specifically, after receiving downlink data from a base station, the radio frequency unit sends the downlink data to the processor 910 for processing. In addition, the radio frequency unit sends uplink data to the base station. Usually, the radio frequency unit 901 includes but is not limited to an antenna, at least one amplifier, a transceiver, a coupler, a low noise amplifier, a duplexer, and the like. In addition, the radio frequency unit 901 may further communicate with a network and another device through a wireless communications system.

The electronic device provides users with wireless broadband Internet access through the network module 902, for example, helps users receive and send e-mails, browse web pages, and access streaming media.

The audio output unit 903 may convert audio data received by the radio frequency unit 901 or the network module 902 or stored in the memory 909 into an audio signal and output the audio signal as sound. In addition, the audio output unit 903 can further provide audio output related to a specific function performed by the electronic device 900 (for example, call signal received sound and message received sound). The audio output unit 903 includes a speaker, a buzzer, a telephone receiver, and the like.

The input unit 904 is configured to receive an audio signal or a video signal. The input unit 904 may include a graphics processing unit (Graphics Processing Unit, GPU) 9041 and a microphone 9042. The graphics processing unit 9041 processes image data of a static picture or a video obtained by an image capture apparatus (such as a camera) in a video capture mode or an image capture mode. A processed image frame may be displayed on the display unit 906. The image frame processed by the graphics processor 9041 may be stored in the memory 909 (or another storage medium) or sent by using the radio frequency unit 901 or the network module 902. The microphone 9042 may receive sound and can process such sound into audio data. Processed audio data may be converted, in a call mode, into a format that can be sent to a mobile communication base station by using the radio frequency unit 901 for output.

The electronic device 900 further includes at least one sensor 905, for example, a light sensor, a motion sensor, and another sensor. Specifically, the light sensor includes an ambient light sensor and a proximity sensor. The ambient light sensor may adjust luminance of the display panel 9061 based on brightness of ambient light. The proximity sensor may turn off the display panel 9061 and/or backlight when the electronic device 900 moves close to an ear. As a type of the motion sensor, an accelerometer sensor may detect an acceleration value in each direction (generally, three axes), and detect a value and a direction of gravity when the accelerometer sensor is static, and may be configured to recognize a posture of the electronic device (such as screen switching between landscape and portrait modes, a related game, or magnetometer posture calibration), a function related to vibration recognition (such as a pedometer or a knock), and the like. The sensor 905 may further include a fingerprint sensor, a pressure sensor, an iris sensor, a molecular sensor, a gyroscope, a barometer, a hygrometer, a thermometer, an infrared sensor, and the like. Details are not described herein.

The display unit 906 is configured to display information entered by a user or information provided for a user. The display unit 906 may include a display panel 9061, and the display panel 9061 may be configured in a form of liquid crystal display (LCD), organic light-emitting diode (OLED), or the like.

The user input unit 907 may be configured to: receive entered digital or content information, and generate key signal input related to a user setting and function control of the electronic device. Specifically, the user input unit 907 includes a touch panel 9071 and another input device 9072. The touch panel 9071, also referred to as a touch screen, may collect a touch operation of a user on or near the touch panel (for example, the user uses any suitable object or accessory such as a finger or a stylus to operate on the touch panel 9071 or near the touch panel 9071). The touch panel 9071 may include two parts: a touch detection apparatus and a touch controller. The touch detection apparatus detects a touch location of the user, detects a signal brought by the touch operation, and sends the signal to the touch controller. The touch controller receives touch information from the touch detection apparatus, converts the touch information into touch point coordinates, sends the touch point coordinates to the processor 910, and receives and executes a command sent by the processor 910. In addition, the touch panel 9071 may be implemented in various types such as a resistor, a capacitor, an infrared ray, or a surface acoustic wave. In addition to the touch panel 9071, the user input unit 907 may further include other input devices 9072. Specifically, the another input device 9072 may include but is not limited to a physical keyboard, a functional button (such as a volume control button or a power on/off button), a trackball, a mouse, and a joystick. Details are not described herein.

Further, the touch panel 9071 may cover the display panel 9061. When detecting the touch operation on or near the touch panel 9071, the touch panel 9071 transmits the touch operation to the processor 910 to determine a type of a touch event, and then the processor 910 provides corresponding visual output on the display panel 9061 based on the type of the touch event. Although in FIG. 9, the touch panel 9071 and the display panel 9061 are configured as two independent components to implement input and output functions of the electronic device, in some embodiments, the touch panel 9071 and the display panel 9061 can be integrated to implement the input and output functions of the electronic device. Details are not limited herein.

The interface unit 908 is an interface for connecting an external apparatus with the electronic device 900. For example, the external apparatus may include a wired or wireless headphone port, an external power supply (or a battery charger) port, a wired or wireless data port, a storage card port, a port used to connect to an apparatus having an identity module, an audio input/output (I/O) port, a video I/O port, a headset port, and the like. The interface unit 908 may be configured to receive an input (for example, data information and power) from an external apparatus and transmit the received input to one or more elements in the electronic device 900, or may be configured to transmit data between the electronic device 900 and the external apparatus.

The memory 909 may be configured to store a software program and various pieces of data. The memory 909 may mainly include a program storage region and a data storage region. The program storage region may store an operating system, an application program required by at least one function (such as a sound play function or an image play function), and the like. The data storage region may store data (such as audio data or an address book) created based on use of the mobile phone, and the like. In addition, the memory 909 may include a high-speed random access memory, and may further include a nonvolatile memory, for example, at least one magnetic disk storage device, a flash storage device, or another volatile solid-state storage device.

The processor 910 is a control center of the electronic device, connects all parts of the entire electronic device by using various interfaces and lines, and performs various functions of the electronic device and data processing by running or executing a software program and/or a module that are/is stored in the memory 909 and by invoking data stored in the memory 909, to overall monitor the electronic device. The processor 910 may include one or more processing units. Optionally, the processor 910 may be integrated with an application processor and a modem processor. The application processor mainly processes the operating system, the user interface, applications, and the like. The modem processor mainly processes wireless communication. It can be understood that, alternatively, the modem processor may not be integrated into the processor 910.

The electronic device 900 may further include the power supply 911 (such as a battery) that supplies power to each component. Optionally, the power supply 911 may be logically connected to the processor 910 by using a power supply management system, so as to implement functions such as charging and discharging management, and power consumption management by using the power supply management system.

In addition, the electronic device 900 includes some function modules not shown. Details are not described herein.

An embodiment of the present application further provides a readable storage medium. The readable storage medium stores a program or an instruction, and when the program or the instruction is executed by a processor, the various processes of the foregoing encoding method embodiment is performed and the same technical effects can be achieved. To avoid repetition, details are not described herein again.

The processor is a processor in the electronic device in the foregoing embodiment. The readable storage medium includes a computer-readable storage medium, and examples of computer-readable storage media include non-transient computer-readable storage media, such as computer read-only memory (ROM), random access memory (RAM), magnetic disks, or optical disks.

An embodiment of the present application further provides a chip, the chip includes a processor and a communication interface, the communication interface is coupled to the processor, and the processor is configured to run programs or instructions to implement each process of the embodiment of the foregoing encoding method and the same technical effects can be achieved. To avoid repetition, details are not described herein again.

It should be understood that the chip mentioned in this embodiment of this application may also be referred to as a system-level chip, a system chip, a chip system, or an on-chip system chip.

It should be noted that, in this specification, the terms “include”, “comprise”, or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. In the absence of more restrictions, an element defined by the statement “including a . . . ” does not preclude the presence of other identical elements in the process, method, article, or apparatus that includes the element. In addition, it should be noted that a scope of the method and the apparatus in the implementations of this application is not limited to: performing a function in a sequence shown or discussed, and may further include: performing a function in a basically simultaneous manner or in a reverse sequence based on an involved function. For example, the described method may be performed in a different order, and various steps may be added, omitted, or combined. In addition, features described with reference to some examples may be combined in other examples.

The foregoing describes the aspects of the present application with reference to flowcharts and/or block diagrams of the method, the apparatus (system), and the computer program product according to the embodiments of the present application. It should be understood that each block in the flowchart and/or block diagram and a combination of blocks in the flowchart and/or block diagram may be implemented by a computer program instruction. These computer program instructions may be provided for a general-purpose computer, a dedicated computer, or a processor of another programmable data processing apparatus to generate a machine, so that when these instructions are executed by the computer or the processor of the another programmable data processing apparatus, specific functions/actions in one or more blocks in the flowcharts and/or in the block diagrams are implemented. The processor may be but is not limited to a general purpose processor, a dedicated processor, a special application processor, or a field programmable logic circuit. It may be further understood that each block in the block diagram and/or flowchart and a combination of blocks in the block diagram and/or flowchart may be implemented by dedicated hardware that performs a specified function or action, or may be implemented by a combination of dedicated hardware and a computer instruction.

Based on the descriptions of the foregoing implementations, a person skilled in the art may clearly understand that the method in the foregoing embodiment may be implemented by software in addition to a necessary universal hardware platform or by hardware only. In most circumstances, the former is a preferred implementation. Based on such an understanding, the technical solutions of this application essentially or the part contributing to the prior art may be implemented in a form of a software product. The computer software product is stored in a storage medium (such as an ROM/RAM, a hard disk, or an optical disc), and includes several instructions for instructing a terminal (which may be mobile phone, a computer, a server, a network device, or the like) to perform the methods described in the embodiments of this application.

The embodiments of this application are described with reference to the accompanying drawings. However, this application is not limited to the foregoing specific implementations. The foregoing specific implementations are merely examples, but are not limiting. Under the enlightenment of this application, a person of ordinary skill in the art may make many forms without departing from the objective and the scope of the claims of this application, and these forms all fall within the protection scope of this application.

What is claimed is:

1. An encoding method, comprising:

determining an encoding bandwidth of an audio signal of a target frame according to an encoding bit rate of the audio signal of the target frame;

determining perceptual entropy of the audio signal of the target frame according to the encoding bandwidth, and determining a bit demand rate of the audio signal of the target frame according to the perceptual entropy; and determining a target number of bits according to the bit demand rate, and encoding the audio signal of the target frame according to the target number of bits.

2. The encoding method according to claim 1, wherein the determining a target number of bits according to the bit demand rate comprises:

determining a fullness degree of a current bit pool according to a number of available bits in the current bit pool and a size of the bit pool;

determining, according to the fullness degree, a bit pool adjustment rate in encoding the audio signal of the target frame, and determining a encoding bit factor according to the bit demand rate and the bit pool adjustment rate; and determining the target number of bits according to the encoding bit factor.

3. The encoding method according to claim 1, wherein the determining perceptual entropy of the audio signal of the target frame according to the encoding bandwidth comprises:

determining a number of scale factor bands of the audio signal of the target frame according to the encoding bandwidth;

obtaining perceptual entropy of each of the scale factor bands; and determining the perceptual entropy of the audio signal of the target frame according to the number of scale factor bands and the perceptual entropy of each of the scale factor bands.

4. The encoding method according to claim 3, wherein the obtaining perceptual entropy of each of the scale factor bands comprises:

determining a modified discrete cosine transform (MDCT) spectral coefficient of the audio signal of the target frame after a MDCT is applied to the audio signal of the target frame;

determining MDCT spectral coefficient energy of each of the scale factor bands according to the MDCT spectral coefficient and a scale factor band offset table; and determining perceptual entropy of each of the scale factor bands according to the MDCT spectral coefficient energy and a masking threshold of each of the scale factor bands.

5. The encoding method according to claim 1, wherein the determining a bit demand rate of the audio signal of the target frame according to the perceptual entropy comprises:

obtaining average perceptual entropy of audio signals of a preset number of frames before the audio signal of the target frame;

determining a difficulty coefficient of the audio signal of the target frame according to the perceptual entropy and the average perceptual entropy; and determining the bit demand rate of the audio signal of the target frame according to the difficulty coefficient.

6. A chip for performing the encoding method according to claim 1, comprising a processor and a communication interface, wherein the communication interface is coupled to the processor, and the processor is configured to run programs or instructions to perform:

determining an encoding bandwidth of an audio signal of a target frame according to an encoding bit rate of the audio signal of the target frame;

determining perceptual entropy of the audio signal of the target frame according to the encoding bandwidth, and determining a bit demand rate of the audio signal of the target frame according to the perceptual entropy; and determining a target number of bits according to the bit demand rate, and encoding the audio signal of the target frame according to the target number of bits.

7. The chip according to claim 6, wherein when determining a target number of bits according to the bit demand rate, the program or instruction is executed by the processor to perform:

determining a fullness degree of a current bit pool according to a number of available bits in the current bit pool and a size of the bit pool;

determining, according to the fullness degree, a bit pool adjustment rate in encoding the audio signal of the target frame, and determining a encoding bit factor according to the bit demand rate and the bit pool adjustment rate; and determining the target number of bits according to the encoding bit factor.

8. The chip according to claim 6, wherein when determining perceptual entropy of the audio signal of the target frame according to the encoding bandwidth, the program or instruction is executed by the processor to perform:

determining a number of scale factor bands of the audio signal of the target frame according to the encoding bandwidth;

obtaining perceptual entropy of each of the scale factor bands; and determining the perceptual entropy of the audio signal of the target frame according to the number of scale factor bands and the perceptual entropy of each of the scale factor bands.

9. The chip according to claim 8, wherein when obtaining perceptual entropy of each of the scale factor bands, the program or instruction is executed by the processor to perform:

determining a modified discrete cosine transform (MDCT) spectral coefficient of the audio signal of the target frame after a MDCT is applied to the audio signal of the target frame;

determining MDCT spectral coefficient energy of each of the scale factor bands according to the MDCT spectral coefficient and a scale factor band offset table; and determining perceptual entropy of each of the scale factor bands according to the MDCT spectral coefficient energy and a masking threshold of each of the scale factor bands.

10. The chip according to claim 6, wherein when determining a bit demand rate of the audio signal of the target frame according to the perceptual entropy, the program or instruction is executed by the processor to perform:

obtaining average perceptual entropy of audio signals of a preset number of frames before the audio signal of the target frame;

determining a difficulty coefficient of the audio signal of the target frame according to the perceptual entropy and the average perceptual entropy; and determining the bit demand rate of the audio signal of the target frame according to the difficulty coefficient.

11. An electronic device, comprising a processor, a memory, and a program or instruction stored on the memory and executable on the processor, wherein the program or instruction is executed by the processor to perform:

determining an encoding bandwidth of an audio signal of a target frame according to an encoding bit rate of the audio signal of the target frame;

determining perceptual entropy of the audio signal of the target frame according to the encoding bandwidth, and determining a bit demand rate of the audio signal of the target frame according to the perceptual entropy; and determining a target number of bits according to the bit demand rate, and encoding the audio signal of the target frame according to the target number of bits.

12. The electronic device according to claim 11, wherein when determining a target number of bits according to the bit demand rate, the program or instruction is executed by the processor to perform:

determining a fullness degree of a current bit pool according to a number of available bits in the current bit pool and a size of the bit pool;

determining, according to the fullness degree, a bit pool adjustment rate in encoding the audio signal of the target frame, and determining a encoding bit factor according to the bit demand rate and the bit pool adjustment rate; and determining the target number of bits according to the encoding bit factor.

13. The electronic device according to claim 11, wherein when determining perceptual entropy of the audio signal of the target frame according to the encoding bandwidth, the program or instruction is executed by the processor to perform:

determining a number of scale factor bands of the audio signal of the target frame according to the encoding bandwidth;

obtaining perceptual entropy of each of the scale factor bands; and determining the perceptual entropy of the audio signal of the target frame according to the number of scale factor bands and the perceptual entropy of each of the scale factor bands.

14. The electronic device according to claim 13, wherein when obtaining perceptual entropy of each of the scale factor bands, the program or instruction is executed by the processor to perform:

determining a modified discrete cosine transform (MDCT) spectral coefficient of the audio signal of the target frame after a MDCT is applied to the audio signal of the target frame;

determining MDCT spectral coefficient energy of each of the scale factor bands according to the MDCT spectral coefficient and a scale factor band offset table; and determining perceptual entropy of each of the scale factor bands according to the MDCT spectral coefficient energy and a masking threshold of each of the scale factor bands.

15. The electronic device according to claim 11, wherein when determining a bit demand rate of the audio signal of the target frame according to the perceptual entropy, the program or instruction is executed by the processor to perform:

obtaining average perceptual entropy of audio signals of a preset number of frames before the audio signal of the target frame;

determining a difficulty coefficient of the audio signal of the target frame according to the perceptual entropy and the average perceptual entropy; and determining the bit demand rate of the audio signal of the target frame according to the difficulty coefficient.

16. A non-transitory readable storage medium, storing a program or an instruction, wherein the program or instruction is executed by a processor to perform:

determining an encoding bandwidth of an audio signal of a target frame according to an encoding bit rate of the audio signal of the target frame;

determining perceptual entropy of the audio signal of the target frame according to the encoding bandwidth, and determining a bit demand rate of the audio signal of the target frame according to the perceptual entropy; and determining a target number of bits according to the bit demand rate, and encoding the audio signal of the target frame according to the target number of bits.

17. The non-transitory readable storage medium according to claim 16, wherein when determining a target number of bits according to the bit demand rate, the program or instruction is executed by the processor to perform:

determining a fullness degree of a current bit pool according to a number of available bits in the current bit pool and a size of the bit pool;

determining, according to the fullness degree, a bit pool adjustment rate in encoding the audio signal of the target frame, and determining a encoding bit factor according to the bit demand rate and the bit pool adjustment rate; and determining the target number of bits according to the encoding bit factor.

18. The non-transitory readable storage medium according to claim 16, wherein when determining perceptual entropy of the audio signal of the target frame according to the encoding bandwidth, the program or instruction is executed by the processor to perform:

determining a number of scale factor bands of the audio signal of the target frame according to the encoding bandwidth;

obtaining perceptual entropy of each of the scale factor bands; and determining the perceptual entropy of the audio signal of the target frame according to the number of scale factor bands and the perceptual entropy of each of the scale factor bands.

19. The non-transitory readable storage medium according to claim 18, wherein when obtaining perceptual entropy of each of the scale factor bands, the program or instruction is executed by the processor to perform:

determining a modified discrete cosine transform (MDCT) spectral coefficient of the audio signal of the target frame after a MDCT is applied to the audio signal of the target frame;

determining MDCT spectral coefficient energy of each of the scale factor bands according to the MDCT spectral coefficient and a scale factor band offset table; and determining perceptual entropy of each of the scale factor bands according to the MDCT spectral coefficient energy and a masking threshold of each of the scale factor bands.

20. The non-transitory readable storage medium according to claim 16, wherein when determining a bit demand rate of the audio signal of the target frame according to the perceptual entropy, the program or instruction is executed by the processor to perform:

obtaining average perceptual entropy of audio signals of a preset number of frames before the audio signal of the target frame;

determining a difficulty coefficient of the audio signal of the target frame according to the perceptual entropy and the average perceptual entropy; and determining the bit demand rate of the audio signal of the target frame according to the difficulty coefficient.

* * * * *